(12) United States Patent
Rongali

(10) Patent No.: US 9,824,106 B1
(45) Date of Patent: Nov. 21, 2017

(54) HASH BASED DATA PROCESSING

(71) Applicant: AMAZON TECHNOLOGIES, INC., Reno, NV (US)

(72) Inventor: Naidu Rongali, Hyderabad (IN)

(73) Assignee: Amazon Technologies, Inc., Reno, NV (US)

( * ) Notice: Subject to any disclaimer, the term of this patent is extended or adjusted under 35 U.S.C. 154(b) by 793 days.

(21) Appl. No.: 14/185,697

(22) Filed: Feb. 20, 2014

(51) Int. Cl.
*G06F 17/30* (2006.01)

(52) U.S. Cl.
CPC .................. *G06F 17/3033* (2013.01)

(58) Field of Classification Search
CPC ........... G06F 17/3033; G06F 17/30286; G06F 17/30312; G06F 17/30321; H04L 9/0643; H04L 29/08234
See application file for complete search history.

(56) References Cited

U.S. PATENT DOCUMENTS

| | | | | |
|---|---|---|---|---|
| 8,122,008 B2 * | 2/2012 | Li | ............. | G06F 17/30498 |
| | | | | 707/713 |
| 8,370,316 B2 * | 2/2013 | Bensberg | ............. | G06F 17/3033 |
| | | | | 707/696 |
| 2002/0194157 A1 * | 12/2002 | Zait | ............. | G06F 17/3033 |
| | | | | 707/2 |
| 2005/0187977 A1 * | 8/2005 | Frost | ............. | G06F 17/30584 |
| | | | | 707/104.1 |
| 2010/0235606 A1 * | 9/2010 | Oreland | ............. | G06F 17/30336 |
| | | | | 711/173 |
| 2014/0280372 A1 * | 9/2014 | Huras | ............. | G06F 17/30584 |
| | | | | 707/803 |

* cited by examiner

*Primary Examiner* — James Trujillo
*Assistant Examiner* — Cheryl M Shechtman
(74) *Attorney, Agent, or Firm* — Lindauer Law, PLLC

(57) ABSTRACT

Hash based data processing generates an output dataset based on combining a plurality of input datasets. Input datasets may be divided into a plurality of portions using a hashing algorithm that hashes based on a data attribute of at least one of the input datasets. Pairs of the portions may then be combined through join operations that may be performed at least partly in parallel, based on the data attribute used in the hashing algorithm. The combined dataset portions resulting from the join operations may then be combined to generate an output dataset to be stored in a location that is accessible to user devices. In some cases, one or more step datasets may be generated and stored prior to the output dataset, the step dataset(s) including subset(s) of the data in the output dataset.

20 Claims, 9 Drawing Sheets

HASH BASED DATA PROCESSING

BACKGROUND

An organization engaged in software development, electronic commerce, or other types of services may generate and consume a large quantity of data regarding operations of the organization. Such data may be processed and provided to data consumers who are internal to or external to the organization. Because the operational data may be employed in making decisions regarding business operations such as marketing, inventory management, system design, and so forth, delays in the providing of operational data may delay or otherwise adversely affect such decision-making.

Figure 1:
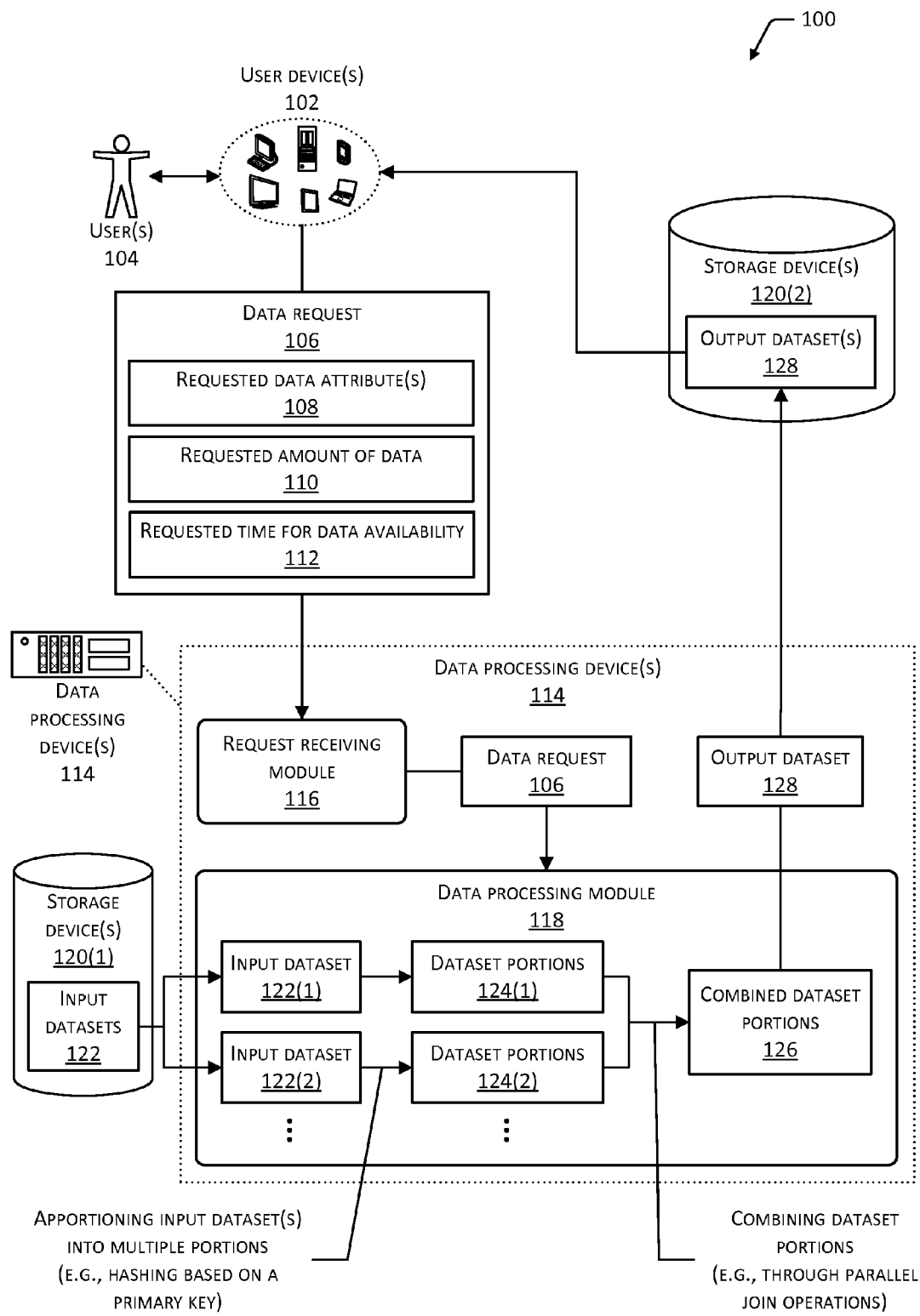
FIG. 1 depicts an environment including one or more data processing devices that perform parallel operations to join or otherwise combine portions of input datasets.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for generating output datasets to be provided to data consumers. In some implementations, two or more input datasets may be apportioned into a plurality of portions, and the portions of the input datasets may be combined via parallel executed join operations. The combined portions may then be combined via an additional join operation, or another type of combination operation, to generate the output dataset. In some cases, the input datasets may be apportioned based on a hashing algorithm that employs, as a hash key, a data attribute that is to be employed to join the portions of the input datasets.

Data warehouses or other types of data storage systems may include one or more datasets (e.g., tables) that each stores data for any number of data attributes or dimensions (e.g., columns). Any number of input datasets may be combined, using join operations or otherwise, to generate any number of output datasets. In some cases, the operations to generate the output dataset(s) may execute periodically. For example, a set of one or more operations may be scheduled to execute daily (e.g., after midnight) to process input datasets that store data collected during the previous day, week, month, and so forth, and output dataset(s) may be generated that include data that was originally present in the input datasets. In some cases the input datasets to be combined may include a large number of data attributes (e.g., columns) or store data in a large number of records (e.g., rows). In such cases, the scheduled processing jobs to combine the input datasets may consume a large amount of time or computing resources prior to completing. By apportioning the input datasets into multiple portions, and by performing parallel operations to join the portions, implementations may enable more efficient and timely combination of large, complex input datasets to generate output datasets to be accessed by data consumers.

One or more data consumers may request an output dataset that includes a plurality of data attributes storing data present in a plurality of input datasets, such that the output dataset is generated by combining or otherwise processing the data present in the input datasets. The output dataset(s) may be employed by the data consumer(s) in making decisions (e.g., business-critical decisions) regarding the operations of a business or other organization. Accordingly, such operational decisions may be delayed in cases where there is a delay in the availability, generation, or retrieval of the input data to be incorporated into the output dataset(s). By providing a parallelization of the combination operations to generate the output dataset(s), implementations may reduce the delay in providing the output dataset(s).

Moreover, in response to the request for an output dataset from data consumer(s), some implementations may provide one or more step datasets that each includes a subset of the requested data attributes, prior to providing the requested output dataset that includes all of the requested data attributes. Such step dataset(s) may be provided earlier than the requested output dataset in cases where at least a portion of the data in the input dataset(s) is delayed in availability or processing. The data consumer(s) may employ the step dataset(s) in their analysis or decision-making in lieu of the requested output dataset that includes all of the requested data attributes, or while waiting for the output dataset to be generated. For example, a data consumer may request an output dataset to be generated daily to include columns A, B, C, and D as data attributes, and may request that the output dataset be available by 0600. In cases where the data for column D is delayed, such that is may not be available by 0600, a step dataset may be generated that includes data for columns A, B, and C and provided to the data consumer to meet the requested availability time. The output dataset including columns A, B, C, and D may be provided later based on the delayed availability of the data for column D.

In some cases, one or more step datasets may be precomputed or otherwise generated. In response to the request for an output dataset, the requesting data consumer(s) may be provided with a list of the step dataset(s) that are available to satisfy, in whole or in part, the request. The requesting data consumer(s) may then select one or more of the step dataset(s) to access, while the requested (e.g., complete) output dataset is being generated.

FIG. 1 depicts an environment 100 in which implementations may operate to generate one or more output datasets by combining or otherwise processing data stored in input datasets. As shown in FIG. 1, the environment 100 may include one or more user devices 102. The user device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the user devices 102 may comprise a cluster, cloud, farm, or other grouping of multiple devices that coordinate operations to provide load balancing, failover support, parallel processing capabilities, shared storage resources, or other aspects. Although examples herein may describe the user devices 102 as physically separate devices, implementations are not so limited. In some cases, the user devices 102 may be a plurality of virtual computing environments, hypervisors, device emulations, or virtual machines executing on one or more physical computing devices. The user device(s) 102 are described further with reference to FIG. 6.

One or more of the user device(s) 102 may be owned by, operated by, or otherwise associated with one or more users 104. A user 104 may employ a user device 102 to generate a data request 106, requesting that an output dataset be generated and provided to the user 104, or stored in a location that is accessible to the user 104 using the user device 102. In some cases, the user(s) 104 may include any number of persons associated with an organization such as a business. The user(s) 104 may generate a data request 106 to request output dataset(s) that include data regarding the operations of the business, such as data regarding sales, shipping, inventory, suppliers, customers, and so forth.

The data request 106 may identify one or more requested data attributes 108 of data to be included in the requested output dataset 128. For example, the user 104 may request an output dataset 128 that includes data for three data attributes (e.g., three columns): the number of sales of a product during a particular day, the price of the product, and the number of customers who browsed a product web page during the particular day. The data request 106 may include a requested amount of data 110. The requested amount of data 110 may be specified as a number of records (e.g., rows) to include in the output dataset, or as a quantity of data (e.g., measured in bytes, kilobytes, and so forth). In some cases, the requested amount of data 110 may be specified as a time period of data, such as the data generated or captured during any number of days, weeks, months, years, and so forth. In some implementations, the data request 106 may indicate a requested time for data availability 112. For example, the data request 106 may specify that the output dataset is to be available to be accessed by the requesting user 104 by 0800 in the morning on one or more days.

The user device(s) 102 may communicate the data request(s) 106 to one or more data processing devices 114. The data processing device(s) 114 may include any type of computing device, including but not limited to those types of computing devices described with reference to the user device(s) 102. In some cases, two or more of the data processing devices 114 may comprise a cluster, cloud, farm, or other grouping of multiple devices that coordinate operations to provide load balancing, failover support, parallel processing capabilities, shared storage resources, or other aspects. The data processing device(s) 114 are described further with reference to FIG. 7.

The data request(s) 106 may be received by a request receiving module 116 executing on the data processing device(s) 114. In some implementations, the request receiving module 116 may analyze the data request(s) 106, and determine whether the data request(s) 106 may be satisfied by dataset(s) that are currently accessible to the user(s) 104 or the user device(s) 102. If so, the request receiving module 116 may respond to the data request 106 with a description of the location of the storage device or other computing device where the requested dataset(s) may be accessed. If it is determined that the requested dataset(s) are not available, the request receiving module 116 may send the data request 106 to a data processing module 118 executing on the data processing device(s) 114.

The data processing module 118 may be configured to access one or more storage devices 120. The storage device(s) 120 may include any number of datastores, databases, or data storage systems that support any type of data storage format. In some cases, the storage device(s) 120 may employ a relational data storage format including one or more formally described tables, each table including one or more columns associated with data attributes. The storage device(s) 120 may be managed through any type of relational database management system (RDBMS) software. The storage device(s) 120 may include any number of relational databases, including but not limited to databases managed through any of the following: Oracle™ Database and MySQL™, from Oracle™ Corporation of Redwood City, Calif., USA; DB2™, from International Business Machines™ (IBM) Corporation of Armonk, N.Y., USA; Linter™, from the RELEX Group of Voronezh, Russia; Microsoft Access™ and Microsoft SQL Server™, from Microsoft™ Corporation of Redmond, Wash., USA; PostgreSQL™, from the PostgreSQL Global Development Group; or SQLite™, from D. Richard Hipp.

The storage device(s) 120 may also include any number of non-relational datastores that employ a non-relational data storage format and that may not comply with a relational database model. Such non-relational datastores may employ a hierarchical database model, or a network database model. The non-relational datastores may also include key-value datastores, hash tables, flat files, associative arrays, other types of data structures, or unstructured data storage. In some cases, the non-relational datastores may store metadata describing data attributes or other aspects of the stored data. The storage device(s) 120 may include any number of non-relational datastores, including but not limited to datastores managed through any of the following: FoxPro™ database management system, from Microsoft™ Corporation of Redmond, Wash., USA; ParAccel™ Analytic Database, from ParAccel™ Incorporated of San Diego, Calif., USA; Berkeley DB from Oracle™ Corporation of Redwood City, Calif., USA; MongoDB™ from MongoDB, Inc. of New York, N.Y., USA; or Cassandra™, CouchDB™, and Hadoop™, from the Apache Software Foundation.

Although the storage device(s) 120 are depicted as external to the user device(s) 102 and the data processing device(s) 114, in some implementations the storage device(s) 120 may be at least partly incorporated into the user device(s) 102, the data processing device(s) 114, or both the user device(s) 102 and the data processing device(s) 114.

In some implementations, the data processing module 118 may analyze the data request 106 and identify one or more input datasets 122 that are stored in the storage device(s) 120(1) and that include data corresponding to the requested data attribute(s) 108. As an example, the requested data attribute(s) 108 may include a number of purchases of a product and a number of copies of the product in a current inventory, and the output dataset may include any number of rows that each corresponds to a particular product. The data processing module 118 may determine that the data for the requested data attribute(s) 108 may be accessed through two input datasets 122 including purchase data and inventory data respectively. In some cases, the data processing module 118 may access data storage metadata that describes, for one or more data attributes, the particular input dataset(s) 122 that store data for the data attribute(s) on one or more storage devices 120(1). The data processing module 118 may employ such metadata to determine one or more input datasets 122 in which to access data for the requested data attribute(s) 108.

The data processing module 118 may determine, based on the data request 106, that data from a plurality of input datasets 122 are to be joined or otherwise combined to generate the requested output dataset. In some implementations, the input datasets 122 may each be apportioned into any number of dataset portions 124, and those dataset portions 124 may be combined through one or more join operations to generate a plurality of combined dataset portions 126. The combined dataset portions 126 may then be combined to generate the requested output dataset 128.

In some implementations, the data request 106 may be received and processed substantially in real time, such that the output dataset(s) 128 are made available to the user(s) 104 in response to the data request 106 within a predetermined period of time of receiving the data request 106. In some implementations, one or more data requests 106 may be received and stored to be processed later. In such cases, the output dataset(s) 128 specified in the data request(s) 106 may be provided at a later date and time, such as at the requested time for data availability. In some cases, the output dataset(s) 128 may be generated (e.g., precomputed) without regard to any particular data request 106. In such cases, in response to a data request 106 one or more previously generated output datasets 128 may be determined to substantially satisfy the data request 106. The determined output dataset(s) 128 may then be made available to the user(s) 104 in response to the data request 106.

Figure 2:
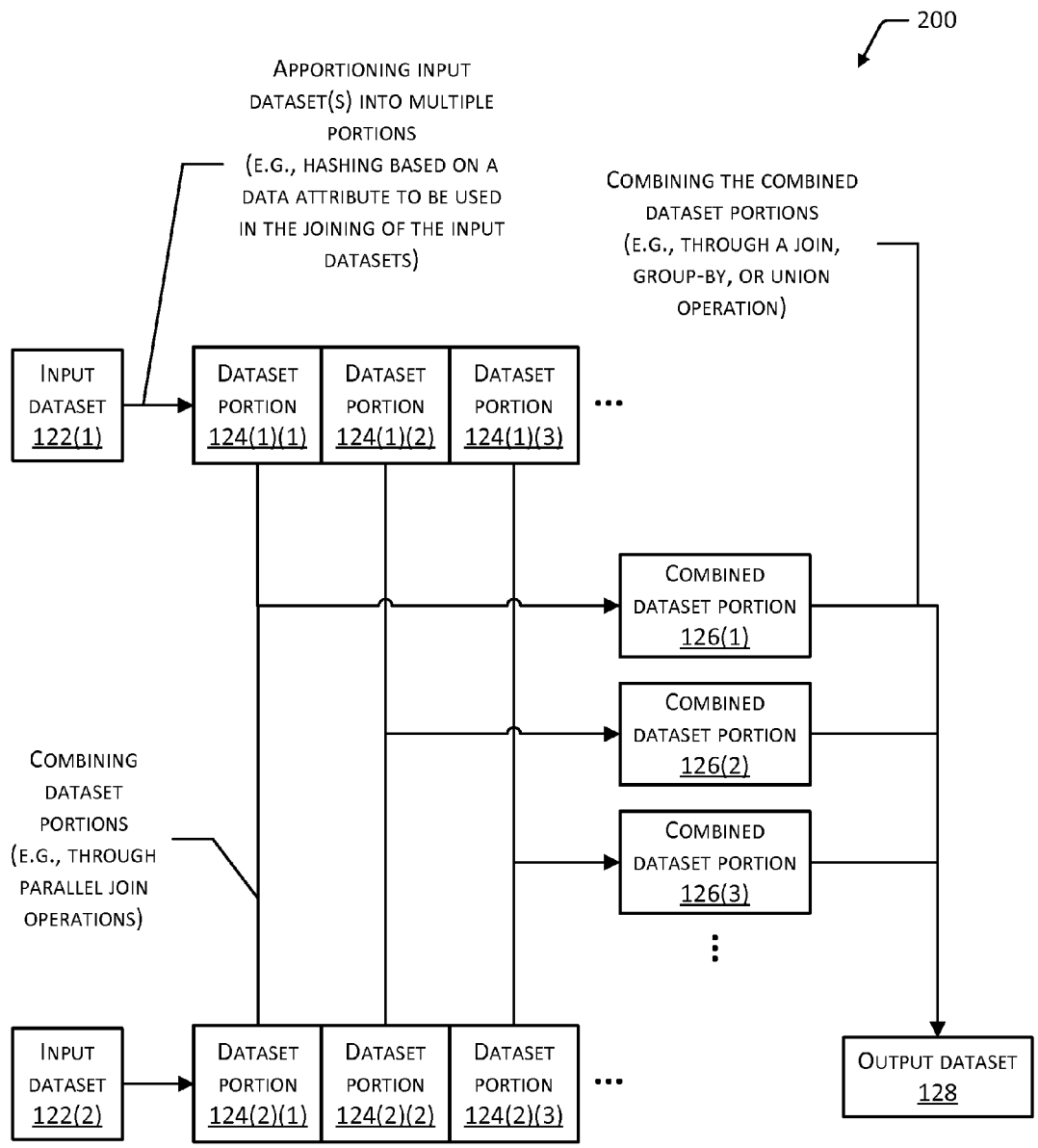
FIG. 2 depicts a schematic illustrating an example of parallel operations to combine portions of two or more input datasets into an output dataset.

FIG. 2 provides an example schematic 200 illustrating the apportioning and combining of the input datasets 122. Although FIG. 2 illustrates a case in which two input datasets 122(1) and 122(2) are combined, implementations support the combination of any number of input datasets 122. In one or more apportioning operations, the input dataset 122(1) is apportioned into a plurality of dataset portions 124(1) and the input dataset 122(2) is apportioned into a plurality of dataset portions 124(2). The apportioning operations may generate any number of dataset portions 124 by apportioning an input dataset 122. In some cases, the number of dataset portions 124 may be sixteen. The input datasets 122 may be apportioned into a same number of dataset portions 124. Alternatively, the input datasets 122 may be apportioned into a different number of dataset portions 124. For example, the input dataset 122(1) may be apportioned into 24 dataset portions 124(1), and the input dataset 122(2) may be apportioned into 16 dataset portions 124(2).

In some implementations, the apportioning operation(s) may employ a hashing algorithm to divide each input dataset 122 into dataset portions 124. The hashing algorithm may employ, as a hash key, a data attribute (e.g., column) of one of the input dataset 122 being apportioned. In some cases, the apportioning may include hashing that employs, as the hash key, one of the data attributes to be used in joining the dataset portions 124. In some cases, apportioning may include hashing that employs the primary key data attribute of the input dataset 122 as a hash key. Employing the primary key data attribute as the hash key may enable the joining of the dataset portions 124 to be performed more efficiently or to complete faster, compared to the use of another data attribute as the hash key. Implementations support the use of any hashing algorithm to apportion the input datasets 122 into dataset portions 124. In some cases, the hashing algorithm may be a modulus function based on the number of dataset portions 124 to be generated. For example, a mod-16 function may be employed as a hashing algorithm to divide the input dataset 122 into 16 dataset portions 124, by applying the mod-16 operation to numeric data stored in the primary key data attribute of records in the input dataset 122.

Corresponding ones of the dataset portions 124(1) and 124(2) may be combined to generate a plurality of combined dataset portions 126. For example, as shown in FIG. 2, the dataset portion 124(1)(1) may be combined with the dataset portion 124(2)(1) to generate the combined dataset portion 126(1), the dataset portion 124(1)(2) may be combined with the dataset portion 124(2)(2) to generate the combined dataset portion 126(2), and so forth. In some cases, the combination operations employed to combine the dataset portions 124 may be join operations. Implementations support the use of any type of join operation to combine dataset portions 124, including but not limited to an inner join operation, an equi-join operation, a natural join operation, a left outer join operation, a right outer join operation, a full outer join operation, or a self-join operation.

The join operations may be based on any data attribute that is present in both of the input datasets 122(1) and 122(2). For example, if the input dataset 122(1) is a product table that includes as a primary key a product identifier (ID), and the input dataset 122(2) is an order table that includes as a secondary key the product ID, the join operations may join dataset portions 124 using the product ID. The join operation for a first pair of dataset portions 124 may employ a same data attribute or a different data attribute as the join operation for a second pair of dataset portions 124.

The combined dataset portions 126 may be combined to generate the output dataset 128. In some cases, the combined dataset portions 126 may be combined using a join operation that joins the combined dataset portions 126 based on the same data attribute employed to apportion the input datasets 122. Alternatively, implementations may employ group-by, union, or other combination operations to combine the combined dataset portions 126 and generate the output dataset 128. The group-by, union, or other operations may also employ the data attribute used in the apportioning of the input datasets 122.

In some implementations, any number of the apportionment operations, the combination operations, or both the apportionment and combination operations may be performed in parallel. Parallel operations may execute at least partly contemporaneously with one another, such that total processing may complete earlier than it may complete absent parallel processing. In some cases, parallel operations may be executed in parallel on different computing devices such as different ones of the data processing devices 114. Alternatively, parallel operations may be executed by separate threads or processes (e.g., separate instances of the data process modules 118) executing on a same computing device.

In some implementations, the join operation used to combine the dataset portions 124 may be a nested loop operation, where the nested loop operation iterates over values of the data attribute (e.g., column) employed in the join operation. For example, the input dataset 122(1) may be a database table A, and the input dataset 122(2) may be a database table B, and tables A and B are to be joined based on a particular column (e.g., shipment ID). The join operation may determine a row of table A corresponding to a particular shipment ID. An index into table B may then be accessed to determine one or more rows of table B corresponding to that shipment ID. Data from the determined row(s) of table B may then be combined with data from the row of table A.

Returning to FIG. 1, the output dataset 128 may be stored in one or more storage devices 120(2) that are accessible to the user device(s) 102. The user device(s) 102 may retrieve and present at least a portion of the output dataset(s) 128 to the user(s) 104. Although FIG. 1 depicts the storage device(s) 120(1) (e.g., storing the input datasets 122) as separate from the storage device(s) 120(2) (e.g., storing the output datasets 128), in some implementations the input datasets 122 and the output dataset(s) 128 may be stored on a same set of one or more storage devices 120. Through the parallel apportionment and combination of multiple input datasets 122 to generate the output dataset 128, implementations may enable the output dataset 128 to be generated and made available to the user(s) 104 earlier than may otherwise be the case in the absence of parallelization.

Figure 3:
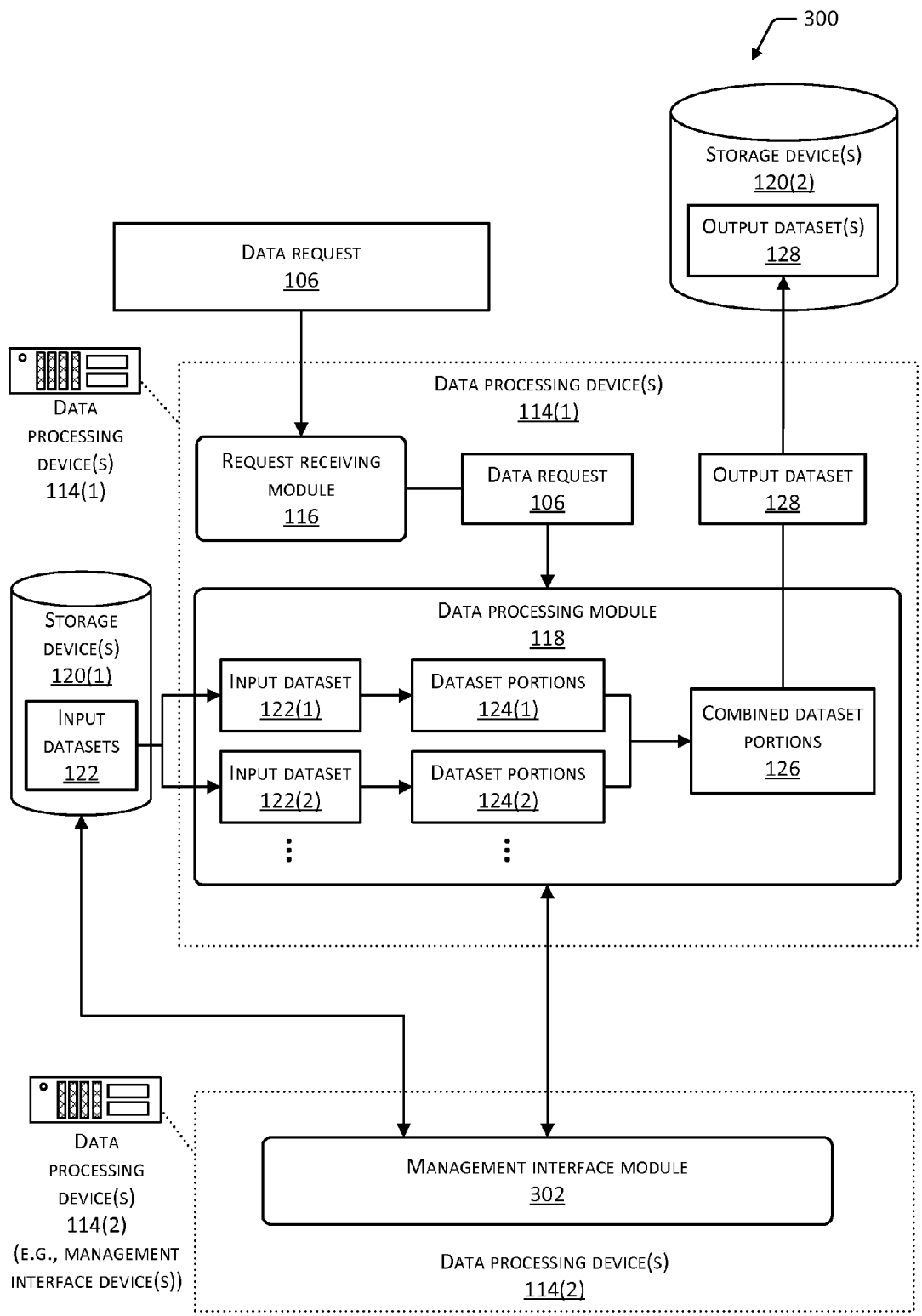
FIG. 3 depicts an environment including one or more data processing devices that perform parallel operations to join or otherwise combine portions of input datasets, the environment further including a management interface module to manage the parallel operations.

FIG. 3 depicts an environment 300 including one or more data processing devices 114(1) that perform parallel operations to join or otherwise combine the dataset portions 124 of the input datasets 122, and including one or more data processing devices 114(2) that execute a management interface module 302 to manage the parallel operations. Elements of the environment 300 may be configured similarly to like-numbered elements of the environment 100, or may perform similar operations to those performed by like-numbered elements of the environment 100.

In implementations illustrated by FIG. 3, the management interface module 302 may provide a processing framework layer or other intermediate layer that interfaces with data storage system managers, database programmers, or other personnel, and that enables the management of the data processing operations performed by the one or more data processing modules 118 executing on the data processing device(s) 114(1). Accordingly, the data processing device(s) 114(2) that execute the management interface module 302 may be described as management interface device(s). The management interface module 302 may interact with one or more of the data processing modules 118 or the storage device(s) 120(1). The management interface module 302 may manage the apportioning of each of the input datasets 122 into a number of the dataset portions 124, to enable the parallel execution of the join operations to combine the input datasets 122 as described herein.

In some implementations, the management interface module 302 may be further configured to parallelize the data processing through date-based partitioning of the input datasets 122. For example, instead of or in addition to apportioning the input datasets 122 by hashing based on a data attribute, the input datasets 122 may be apportioned into a plurality of dataset portions 124 having different ranges of dates when the records were created or updated. Moreover, in some implementations the management interface module 302 may be further configured to parallelize the data process by employing one or more indexes on the input datasets 122. In such cases, the input datasets 122 may be apportioned into multiple dataset portions 124 and the dataset portions 124 may be joined using parallel index lookups into the indexes corresponding to the input datasets 122.

The management interface module 302 may optimize the data processing operations by determining a number of dataset portions 124 into which to apportion the input datasets 122, and by determining a number of different data processing device(s) 114(1) to employ in performing parallel data processing operations such as the parallel join operations described herein. In some cases, the optimization may enable the data processing operations to be performed in minimal time or using minimal computing resources.

Figure 4:
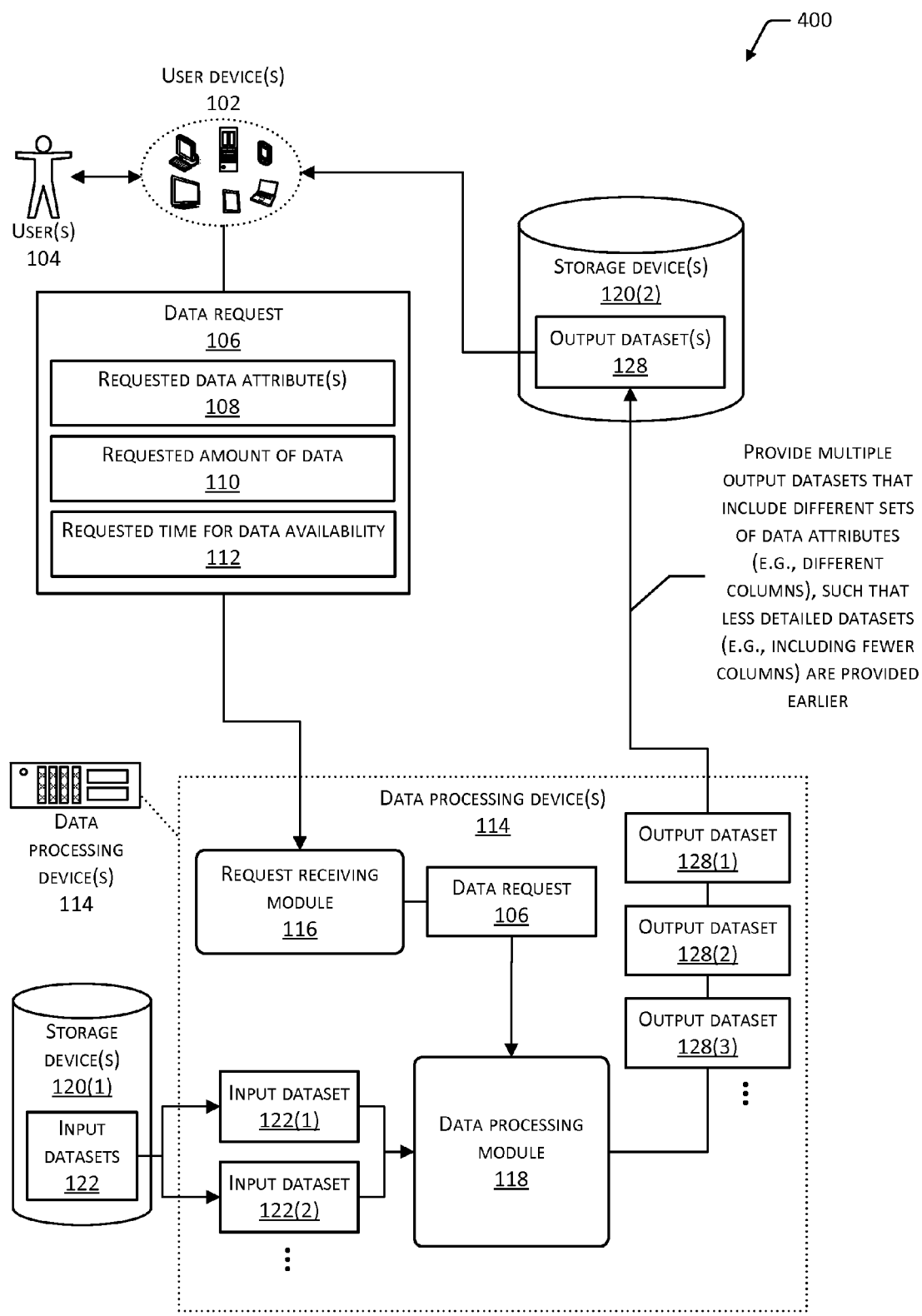
FIG. 4 depicts an environment including one or more data processing devices that perform operations to provide different datasets of different data attributes.

FIG. 4 depicts an environment 400 including one or more data processing devices 114 that perform operations to provide multiple output datasets 128 that include different data attributes. Elements of the environment 400 may be configured similarly to like-numbered elements of the environment 100, or may perform similar operations to those performed by like-numbered elements of the environment 100.

As shown in FIG. 4, the data processing module 118 may receive the data request 106. Based on an analysis of the data request 106, the data processing module 118 may identify a plurality of input datasets 122 that store data to be incorporated into the requested output dataset 128 or that store data to be used to generate the data for the output dataset 128. In implementations illustrated by FIG. 4, the requested output dataset 128 may not be available by the requested time for data availability 112 specified in the data request 106. In some cases, the output dataset 128 may not be available by the requested time for data availability 112 because the data of the input dataset(s) 122 may not be available early enough so that it may be retrieved and processed by the requested time for data availability 112. In such implementations, multiple output datasets 128 may be generated that include different subsets of the data to be included in the requested output dataset 128.

Figure 5:
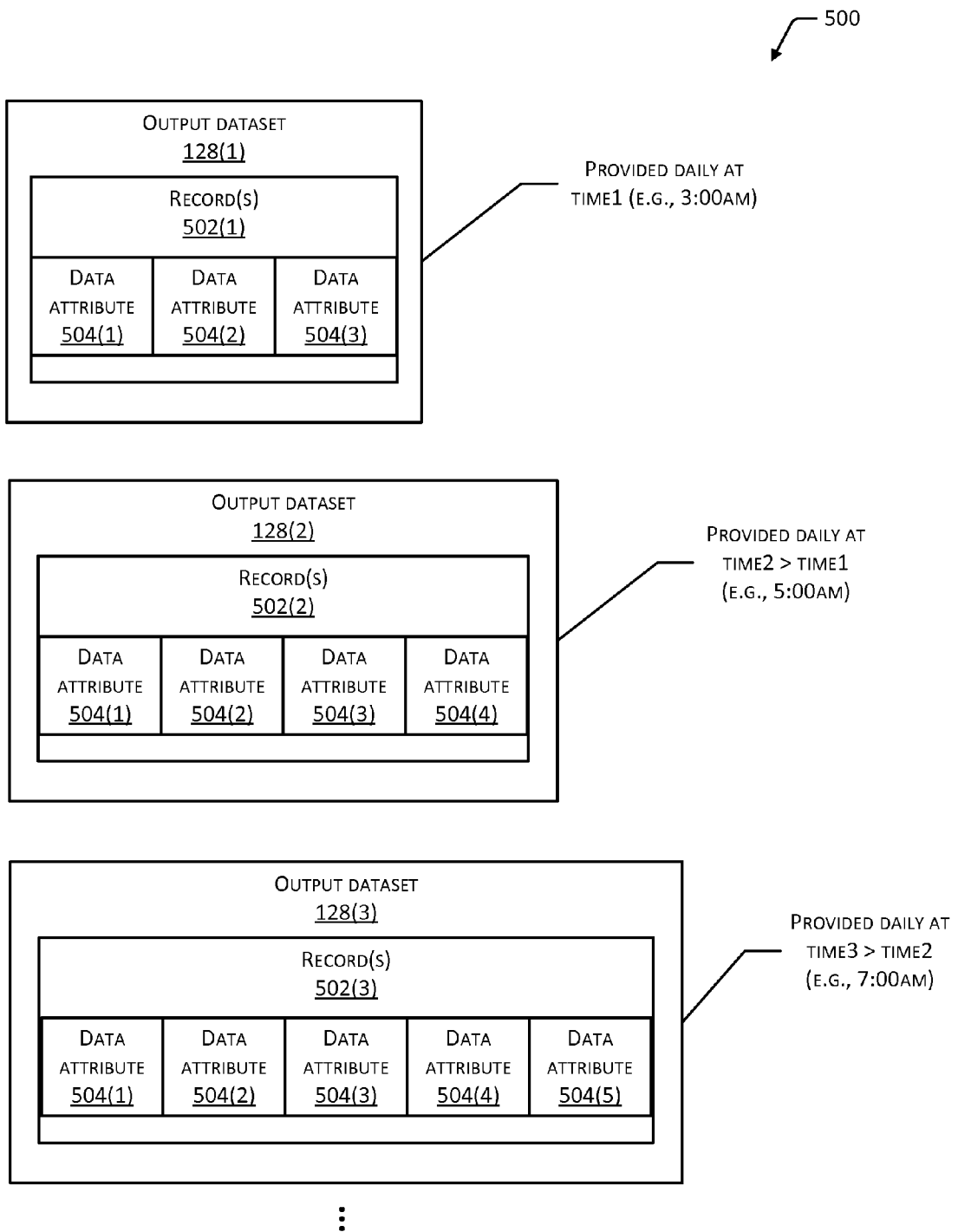
FIG. 5 depicts a schematic of example output datasets that include different data attributes.

FIG. 5 depicts a schematic 500 of example output datasets 128 that include different data attributes. Although FIG. 5 depicts an example in which three output datasets 128 are provided, implementations support the providing of any number of output datasets 128. As shown in the example, a first output dataset 128(1) may include any number of records 502(1) (e.g., rows), and each record 502(1) may include data for three data attributes 504 (e.g., columns). A second output dataset 128(2) may include records 502(2) including four data attributes 504. A third output dataset 128(3) may include records 502(3) including five data attributes 504. For example, the data request 106 may specify requested data attributes 108 for columns A, B, C, D, and E, and data for all of the requested data attributes 108 may not be available by the requested time for data availability 112. Accordingly, a first output dataset 128(1) (e.g., a first step table) may be provided that includes a subset of the requested data, such as columns A, B, and C. A second output dataset 128(2) (e.g., a second step table) may be provided that includes a different subset of the requested data, such as columns A, B, C, and D. A third output dataset 128(3), the requested output dataset 128, may be provided that includes columns A, B, C, D, and E (e.g., all of the requested data attributes 108).

By providing a subset of the requested data to the requesting users 104 by the requested time for data availability 112, implementations may enable business operations to proceed and mitigate potential problems due to delays in the availability of the requested output dataset 128. For example, a user 104 may submit a data request 106 requesting an output dataset 128 including a plurality of rows each corresponding to a product, and identified by a product ID. The data request 106 may include a plurality of requested data attributes 108 corresponding to a product, including: a product ID of the product, a marketplace ID identifying a marketplace in which the product is sold (e.g., an online marketplace), a date identifying the day corresponding to the product data, the number of orders or purchases of the product during the day, the count of the product in inventory, and view information describing the content of a product web page corresponding to the product. The data request 106 may also specify 0300 as a requested time for data availability 112, and processing to generate the output dataset 128 may begin after midnight on the subsequent day. Operations to determine the total number of orders or purchases of the product during the previous day, or operations to determine the number of product in inventory, may not complete by 0300. In such cases, a step output dataset 128(1) including the product ID, the marketplace ID, the date, and the view information may be provided by 0300 in lieu of the full requested output dataset 128, while the processing is being performed to determine the total number of orders or product inventory information.

In some implementations, the multiple output datasets 128 may include corresponding records at differing levels of detail. For example, a first output dataset 128(1) may include a number of rows corresponding to shipments, each identified by a shipment ID, and the second output dataset 128(2) may include rows corresponding to the same shipments. The first output dataset 128(1) may include columns for shipment ID, date, and product ID, whereas the second output dataset 128(2) may include columns for shipment ID, date, product ID, carrier, and shipment completion data. Accordingly, implementations may provide multiple output datasets 128 that each provides a different view into similar data with varying degrees of detail.

In some implementations, the particular output datasets 128 to provide in response to a particular data request 106 may be determined based on interactions with the requesting user(s) 104 to determine an amount of data (e.g., a minimum amount of data) that may enable the users 104 to perform their analysis. The determination of the output datasets 128 may be based on error reports, bug reports, trouble tickets, support requests, or other information received from data consuming user(s) 104 or from processes that consume the output dataset(s) 128. In some cases, the data requests of multiple users 104 may be balanced against the processing, storage, or networking capabilities of the data processing devices 114 or other devices to determine an optimal set of output datasets 128 that optimize the fulfillment of at least a portion of the data requests 106.

In some implementations, the multiple output datasets 128, including one or more step datasets, may be generated (e.g., precomputed) without regard to any particular data request 106. In such cases, in response to a data request 106 the requesting user(s) 104 may be presented with a list of one or more output datasets 128 (e.g., step datasets) that may satisfy the criteria included in the data request 106. The user(s) 104 may then select one of the output dataset(s) 128 to substantially satisfy the data request 106, or may choose to wait until the requested output dataset 128 (e.g., the whole output dataset 128) is available.

The various devices of the environments 100, 300, and 400 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100, 300, and 400 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

Figure 6:
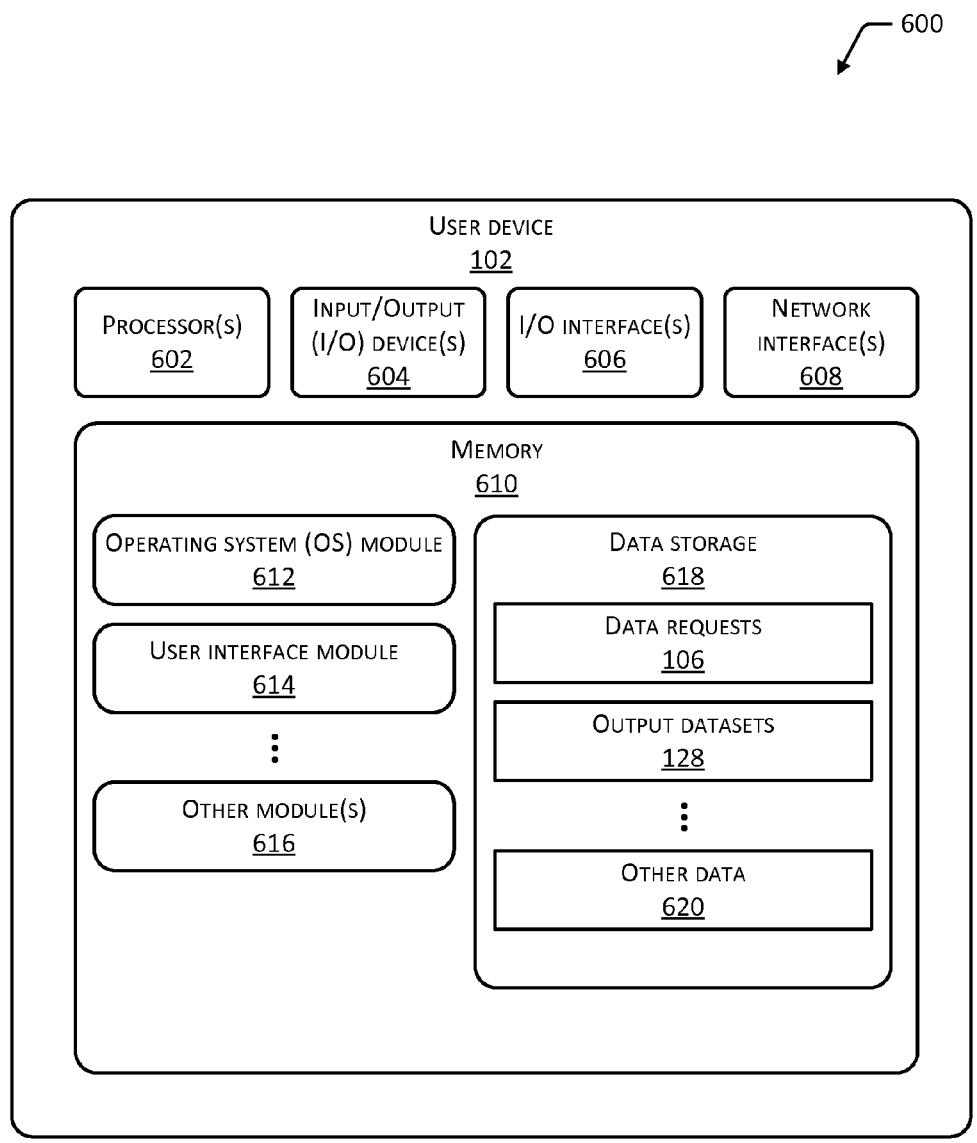
FIG. 6 depicts a block diagram of an example user device configured to generate data requests for output datasets and to access the output datasets.

FIG. 6 depicts a block diagram 600 of an example of the user device(s) 102. As shown in the block diagram 600, the user device 102 may include one or more processors 602 (e.g., hardware-based processor(s)) configured to execute one or more stored instructions. The processor(s) 602 may comprise one or more cores.

The user device 102 may include one or more input/output (I/O) devices 604. The I/O device(s) 604 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 604 may also include output devices such as a display, an audio output device (e.g., a speaker), a printer, a haptic output device, and so forth. The I/O device(s) 604 may be physically incorporated with the user device 102, or may be externally placed.

The user device 102 may include one or more I/O interfaces 606 to enable components or modules of the user device 102 to control, interface with, or otherwise communicate with the I/O device(s) 604. The I/O interface(s) 606 may enable information to be transferred in or out of the user device 102, or between components of the user device 102, through serial communication, parallel communication, or other types of communication. For example, the I/O interface(s) 606 may comply with a version of the RS-232 standard for serial ports, or with a version of the Institute of Electrical and Electronics Engineers (IEEE) 1284 standard for parallel ports. As another example, the I/O interface(s) 606 may be configured to provide a connection over Universal Serial Bus (USB) or Ethernet. In some cases, the I/O interface(s) 606 may be configured to provide a serial connection that is compliant with a version of the IEEE 1394 standard. The user device 102 may also include one or more busses or other internal communications hardware or software that allow for the transfer of data between the various modules and components of the user device 102.

The user device 102 may include one or more network interfaces 608 that enable communications between the user device 102 and other network accessible computing devices, such as the data processing device(s) 114 and the storage device(s) 120(2). The network interface(s) 608 may include one or more network interface controllers (NICs) or other types of transceiver devices configured to send and receive communications over a network.

The user device 102 may include one or more memories, described herein as memory 610. The memory 610 comprises one or more computer-readable storage media (CRSM). The CRSM may include one or more of an electronic storage medium, a magnetic storage medium, an optical storage medium, a quantum storage medium, a mechanical computer storage medium, and so forth. The memory 610 provides storage of computer-readable instructions that may describe data structures, program modules, processes, applications, or other data for the operation of the user device 102. In some implementations, the memory 610 may provide storage of computer-readable instructions or other information in a non-transitory format.

The memory 610 may include an operating system (OS) module 612. The OS module 612 may be configured to manage hardware resources such as the I/O device(s) 604, the I/O interface(s) 606, and the network interface(s) 608, and to provide various services to applications, processes, or modules executing on the processor(s) 602. The OS module 612 may include one or more of the following: any version of the Linux™ operating system; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems' of Alameda, Calif., USA; or other operating systems.

The memory 610 may include one or more of the modules executing on the user device 102. In some implementations, the memory 610 may include a user interface module 614 that provides a graphical user interface, command line user interface, or other interface that enables the user 104 to enter information to be included in the data request 106, and to send the data request 106 to the data processing device(s) 114. The user interface module 614 may also enable at least a portion of the output dataset(s) 128 to be presented to the user 104. In some cases the user interface module 614 may provide a web interface presented through a web browser. The memory 610 may also include one or more other modules 616, such as a user authentication module or an access control module to secure access to the user device 102, and so forth.

The memory 610 may include data storage 618 to store data for operations of the user device 102. The data storage 618 may comprise a database, array, structured list, tree, or other data structure, and may be a relational or a non-relational datastore. The data storage 618 may store data such as that described above, including one or more of the data request(s) 106 or the output dataset(s) 128. The data storage 618 may also store other data 620, such as user authentication information or access control data. In some implementations, at least a portion of the information stored in the data storage 618 may be stored externally to the user device 102, on other devices that may communicate with the user device 102 via the I/O interface(s) 606 or via the network interface(s) 608.

Figure 7:
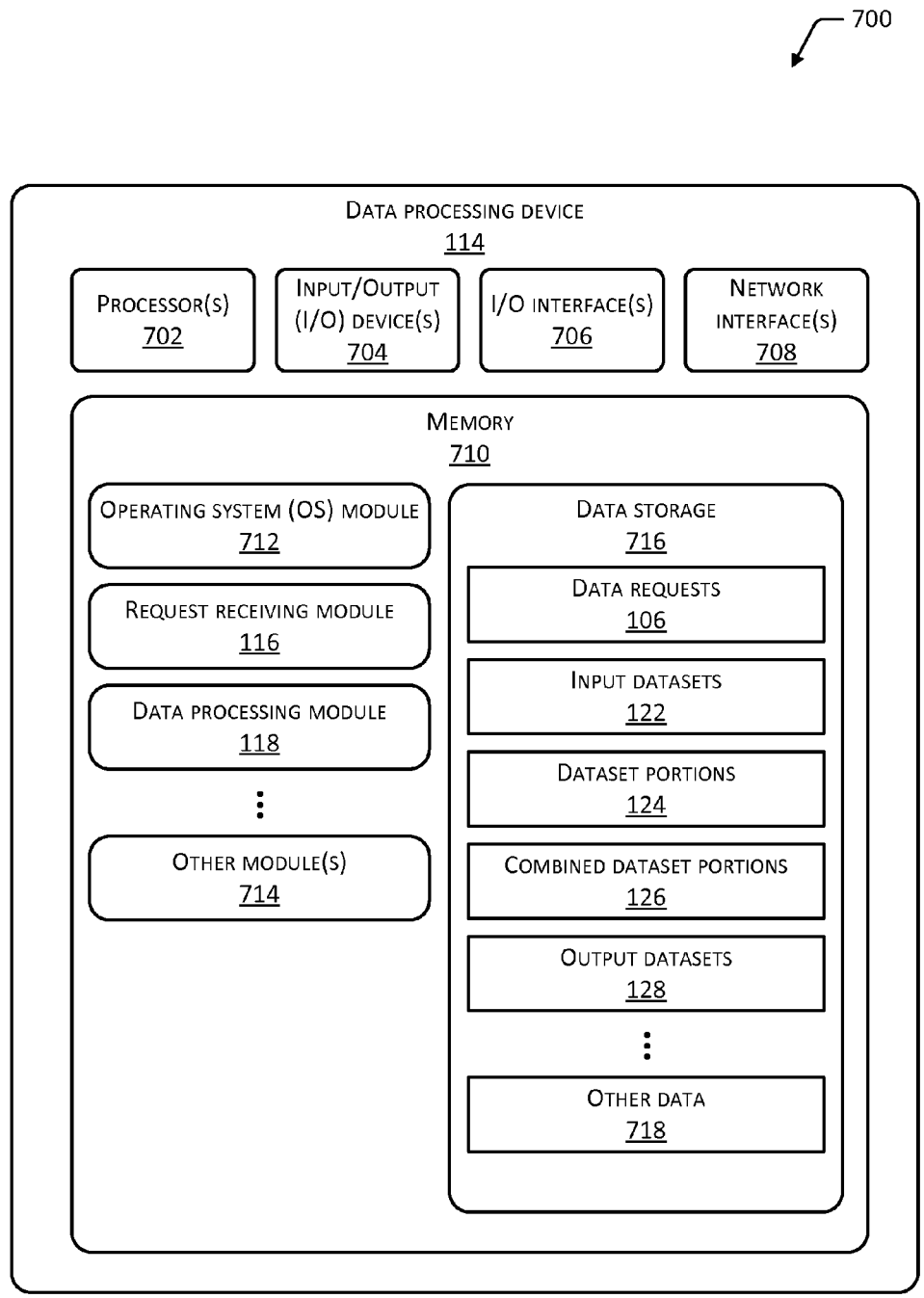
FIG. 7 depicts a block diagram of an example data processing device configured to generate output datasets based on the processing of input datasets.

FIG. 7 depicts a block diagram 700 of an example of the data processing device(s) 114. As shown in the block diagram 700, the data processing device 114 may include one or more processors 702 (e.g., hardware-based processor(s)) configured to execute one or more stored instructions. The processor(s) 702 may comprise one or more cores. The data processing device 114 may include one or more I/O devices 704, one or more I/O interfaces 706, and one or more network interfaces 708 as described above respectively with reference to the I/O device(s) 604, the I/O interface(s) 606, and the network interface(s) 608.

The data processing device 114 may include one or more memories, described herein as memory 710. The memory 710 comprises one or more CRSM, as described above with reference to the memory 610. The memory 710 may include an OS module 712 that is configured to manage hardware resources such as the I/O device(s) 704, the I/O interface(s) 706, and the network interface(s) 708, and to provide various services to applications, processes, or modules executing on the processor(s) 702. The OS module 712 may include one or more of the operating systems described above with reference to the OS module 612. The memory 710 may include one or more of the modules described above as executing on the data processing device 114, such as the request receiving module 116 and the data processing module 118. The memory 710 may also include one or more other modules 714, such as a user authentication module or an access control module to secure access to the data processing device 114, and so forth.

The memory 710 may include data storage 716 to store data for operations of the data processing device 114. The data storage 716 may comprise a database, array, structured list, tree, or other data structure, and may be a relational or a non-relational datastore. The data storage 716 may include data that is in active memory on the data processing device 114, or data that is written to a hard drive, disk, or other non-volatile storage on the data processing device 114. The data storage 716 may store data such as that described above, including one or more of the data request(s) 106, the input datasets 122, the dataset portions 124, the combined dataset portions 126, or the output dataset(s) 128. The data storage 716 may also store other data 718, such as user authentication information or access control data. In some implementations, at least a portion of the information stored in the data storage 716 may be stored externally to the data processing device 114, on other devices that may communicate with the data processing device 114 via the I/O interface(s) 706 or via the network interface(s) 708.

Figure 8:
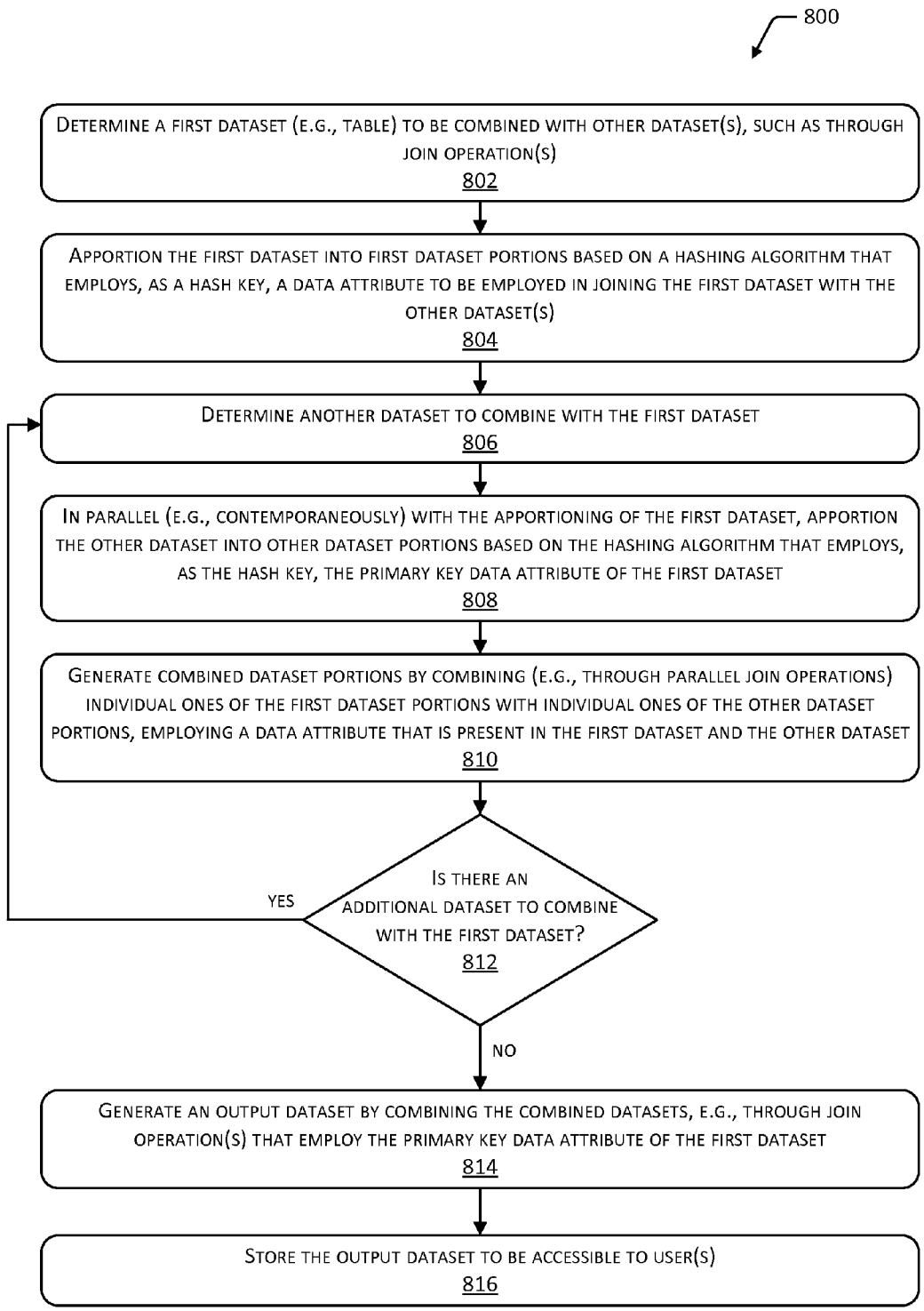
FIG. 8 depicts a flow diagram of a process for generating an output dataset through parallel operations that combine portions of two or more input datasets.

FIG. 8 depicts a flow diagram 800 of a process for generating an output dataset 128 through parallel operations to combine portions of two or more input datasets 122 as described above with reference to FIGS. 1-3. One or more operations of the process may be performed by the request receiving module 116, the data processing module 118, by other modules executing on the data processing device(s) 114, or by modules executing on other devices.

At 802, a first input dataset 122 (e.g., database table) may be determined, the first input dataset 122 to be combined with one or more other input datasets 122. In some cases, the first input dataset 122, and the other input dataset(s) 122 to be combined with it, may be determined based on an analysis of a received data request 106 specifying one or more requested data attributes 108 to be included in an output dataset 128. For example, the input datasets 122 may be determined as those tables that store data for the requested data attributes 108 or that store data from which the requested data attributes 108 may be derived. In some cases, the first input dataset 122 may be a smaller dataset than the input dataset(s) 122 with which it is to be combined. For example, the first input dataset 122 may store data generated during a particular day (e.g., the previous day) whereas the other input dataset(s) 122 may store data that was generated over a longer period of time (e.g., one or more years of generated data).

At 804, the first input dataset 122 is apportioned into any number of first dataset portions 124. In some implementations, the apportioning may be based on a hashing algorithm that employs, as a hash key, one of the data attributes (e.g., columns) included in the first input dataset 122. In some cases, the hash key may be one of the one or more data attributes to be employed in joining the first input dataset 122 with the one or more other input datasets 122. In some cases, the hash key may be the primary key data attribute of the first input dataset 122.

At 806, another input dataset 122 is determined to be combined with the first input dataset 122. At 808, the other input dataset 122 is apportioned into any number of other dataset portions 124. In some implementations, the apportioning may be based on the hashing algorithm employed to apportion the first input dataset 122, and may employ the same hash key. In some cases, the apportioning of the other input dataset 122 may proceed in parallel (e.g., at least partly contemporaneously with) the apportioning of the first input dataset 122 at 804.

At 810, a plurality of combined dataset portions 126 may be generated by combining individual ones of the first dataset portions 124 with individual ones of the other dataset portions 124. As described above with reference to FIG. 2, the combining may be through one or more join operations that employ a data attribute (e.g., column) that is present in both the first input dataset 122 and the other input dataset 122. In some cases, the combining at 810 may include any number of join operations executed in parallel. In cases where the apportioning of the input datasets 122 at 804 employed a primary key as a hash key, a nested loop algorithm may be employed to perform the join operations at 810.

At 812, a determination is made whether there is at least one additional input dataset 122 to be combined with the first input dataset 122. If so, the process may return to 806 and determine another input dataset 122 to combine with the first input dataset 122. If not, the process may proceed to 814.

At 814, the output dataset 128 may be generated by combining the combined dataset portions 126 generated at 810 during one or more iterations of the process. In some cases, the combination at 814 may include one or more join operations on the same data attribute (e.g., the primary key) that was employed to apportion the first input dataset 122 at 804. The combination at 814 may also employ other types of operations, including but not limited to group-by operations and union operations. At 816, the output dataset 128 may be stored in the storage device 120(2) or in another location that is accessible by the user device(s) 102 or the user(s) 104.

Figure 9:
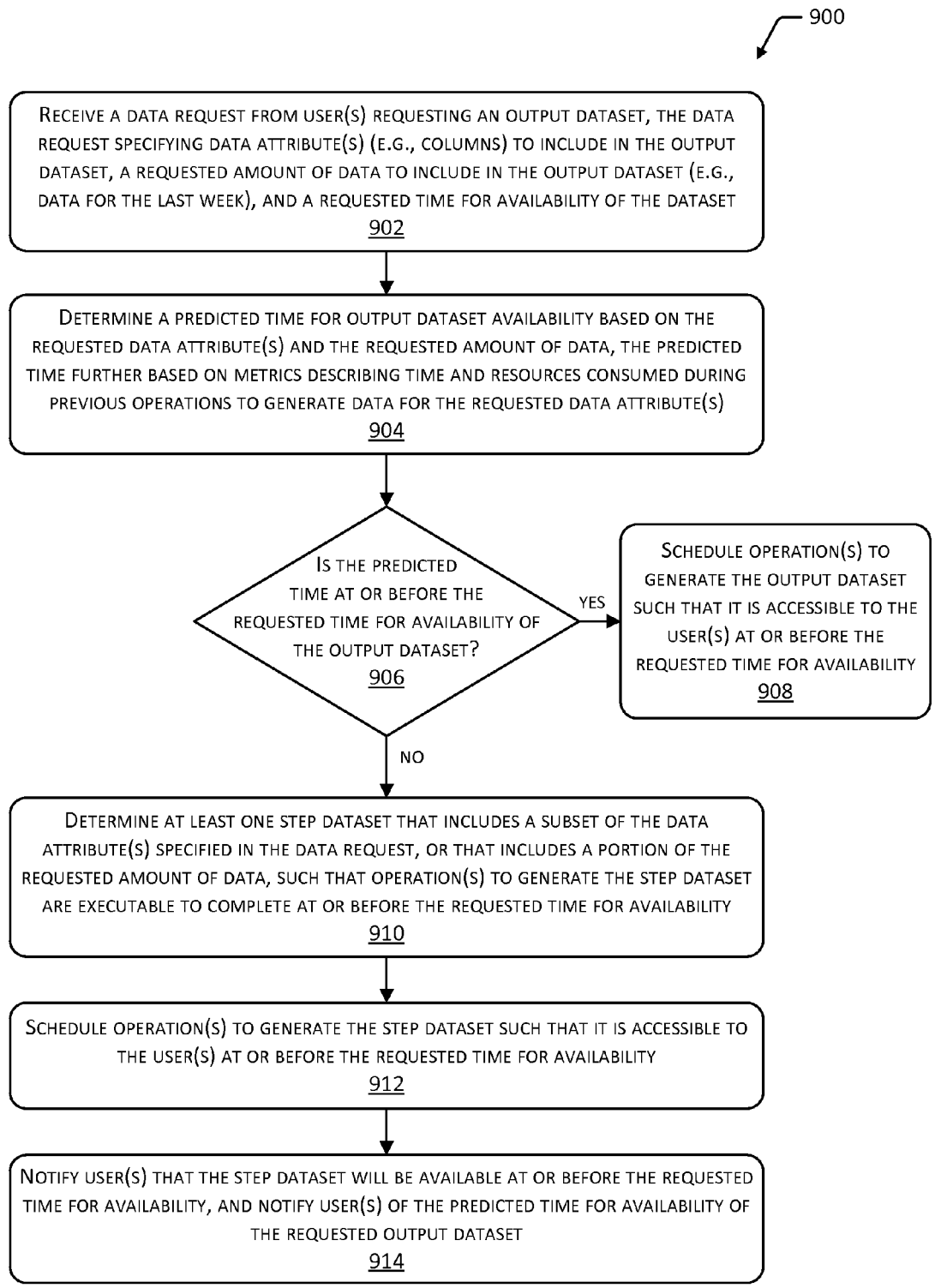
FIG. 9 depicts a flow diagram of a process for generating two or more output datasets including one or more step datasets that each includes a subset of the data attributes specified in a data request for an output dataset.

FIG. 9 depicts a flow diagram 900 of a process for generating two or more output datasets 128 including one or more step datasets that each includes a subset of the requested data attributes 108 specified in the data request 106 for an output dataset 128, as described above with reference to FIGS. 4 and 5. One or more operations of the process may be performed by the request receiving module 116, the data processing module 118, by other modules executing on the data processing device(s) 114, or by modules executing on other devices.

At 902, the data request 106 is received from one or more users 104, requesting an output dataset 128 to be generated. The data request 106 may specify the requested data attribute(s) 108 (e.g., columns) to include in the output dataset 128, the requested amount of data 110 to include in the output dataset 128, and a requested time for data availability 112.

At 904, a determination is made of a predicted time for availability of the requested output dataset 128. The determination may be based on the requested data attribute(s) 108 and the requested amount of data 110 (e.g., data generated during the previous day, week, month, year, decade, etc.). The process may access information that includes metrics describing the amount of time of resources consumed during previous operations to generate the data for the requested data attribute(s) 108. Such metrics may be employed to predict the time when the requested output dataset 128 may be available based on the requested data attribute(s) 108 and the requested amount of data 110.

At 906, a determination is made whether the predicted time determined at 904 is at or before the requested time for data availability 112. If so, the process may proceed to 908 and schedule one or more operations to generate the output dataset 128 such that it is accessible to the requesting user(s) 104 at or before the requested time for data availability 112. If not, the process may proceed to 910.

At 910, at least one step output dataset 128 may be determined that includes a subset of the requested data attribute(s) 108 specified in the data request 106. Alternatively, the step output dataset 128 may be determined to include a portion of the requested amount of data 110. For example, the requested amount of data 110 may be the data generated during the previous month, and a step output dataset 128 may be designated to include a subset of that data generated during the previous week. The step output dataset 128 may be determined such that operations to generate the step output dataset 128 may complete at or before the requested time for data availability 112.

At 912, one or more operations may be scheduled to generate the step output dataset 128 such that it is accessible by the requesting user(s) 104 at or before the requested time for data availability 112. At 914, in some implementations the requesting user(s) 104 may be notified that the step output dataset 128 is to be made available at or before the requested time for data availability 112, and may include a subset of the requested data to be included in the requested output dataset 128 (e.g., the full output dataset 128). The user(s) 104 may also be notified of the predicted time for availability of the requested output dataset 128 (e.g., the full output dataset 128), as determined at 904.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solidstate memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method of data processing by a data processing device, comprising:
    apportioning a first dataset into a plurality of first dataset portions based on a hashing algorithm that employs, as a hash key, a first data attribute of the first dataset;
    apportioning a second dataset into a plurality of second dataset portions based on the hashing algorithm that employs, as the hash key, the first data attribute of the first dataset;
    apportioning a third dataset into a plurality of third dataset portions based on the hashing algorithm that employs, as the hash key, the first data attribute of the first dataset, one or more of the first dataset, the second dataset, or the third dataset being a table included in a relational database;
    storing the plurality of first dataset portions, the plurality of second dataset portions, and the plurality of third dataset portions in a data storage device;
    generating a plurality of fourth dataset portions by performing a plurality of first join operations to combine individual ones of the plurality of first dataset portions to individual ones of the plurality of second dataset portions, the plurality of first join operations employing the first data attribute, two or more of the plurality of first join operations performed at least partly in parallel;
    generating a plurality of fifth dataset portions by performing a plurality of second join operations to combine individual ones of the plurality of first dataset portions to individual ones of the plurality of third dataset portions, the plurality of second join operations employing a second data attribute that is present in the first dataset and the third dataset, two or more of the plurality of second join operations performed at least partly in parallel, the second data attribute being different than the first data attribute;
    storing the plurality of fourth dataset portions and the plurality of fifth dataset portions in the data storage device;
    receiving, from a user device, a data request for an output dataset specifying data associated with one or more requested data attributes, the data request including a requested time for data availability;
    determining, based on the data request, that the data associated with the requested data attributes is accessible from a combination formed by joining the plurality of fourth dataset portions and the plurality of fifth dataset portions using the first data attribute of the first dataset;
    determining a predicted time for availability of the output dataset exceeds the requested time for data availability for the output dataset;
    in response to the predicted time for availability of the output dataset exceeding the requested time for data availability for the output dataset, providing to the user device the fourth dataset portions and the fifth dataset portions during the requested time for data availability;
    generating the output dataset by performing a plurality of combination operations to generate a combination of the plurality of fourth dataset portions and the plurality of fifth dataset portions based on the first data attribute of the first dataset, the plurality of combination operations including one or more of a join operation, a group-by operation, or a union operation;
    storing the output dataset in the data storage device; and
    providing, to the user device, the output dataset in response to the data request at a time exceeding the requested time for data availability.

2. The method of claim 1, wherein the plurality of second dataset portions includes a different number of portions than the plurality of third dataset portions.

3. The method of claim 1, wherein the first data attribute is a primary key data attribute of the first dataset.

4. The method of claim 1, wherein the hashing algorithm includes a modulus operation.

5. A system, comprising:
    at least one computing device configured to implement one or more services, wherein the one or more services are configured to:
        apportion a first dataset into a plurality of first dataset portions based on a first data attribute of the first dataset;
        apportion a second dataset into a plurality of second dataset portions with a different number of dataset portions than the plurality of first dataset portions, apportioning of the second dataset into the plurality of second dataset portions is based on a second data attribute of the second dataset, the second data attribute being different than the first data attribute of the first dataset;
        store the plurality of first dataset portions and the second dataset portions in a data storage device;
        generate a plurality of third dataset portions by performing a plurality of join operations to combine individual ones of the plurality of first dataset portions to individual ones of the plurality of second dataset portions, the plurality of join operations employing the first data attribute that is present in the first dataset and the second dataset;
        store the plurality of third dataset portions in the data storage device;
        receive, from a user device, a data request for an output dataset specifying data associated with one or more requested data attributes, the data request including a requested time for data availability;

determine, based on the data request, that the data associated with the requested data attributes is accessible from a combination formed by joining the plurality of third dataset portions and the first dataset portions using the first data attribute of the first dataset;

determining a predicted time for availability of the output dataset exceeds the requested time for data availability for the output dataset;

in response to the predicted time for availability of the output dataset exceeding the requested time for data availability for the output dataset, providing to the user device the third dataset portions and the first dataset portions during the requested time for data availability;

generate the output dataset by performing a plurality of combination operations to generate a combination of the plurality of third dataset portions and the first dataset portions based on the first data attribute of the first dataset; and provide, to the user device, the output dataset in response to the data request at a time exceeding the requested time for data availability.

6. The system of claim 5, wherein one or more of the apportioning of the first dataset or the apportioning of the second dataset is based on a hashing algorithm that employs, as a hash key, the first data attribute.

7. The system of claim 6, wherein the hash key is a primary key data attribute of the first dataset.

8. The system of claim 6, wherein the hashing algorithm includes a modulus operation.

9. The system of claim 5, wherein:
two or more of the plurality of join operations are performed at least partly in parallel.

10. The system of claim 5, wherein the plurality of combination operations includes one or more of a join operation, a group-by operation, or a union operation.

11. The system of claim 5, wherein one or more of the plurality of join operations includes one or more of:
an inner join operation;
an equi-join operation;
a natural join operation;
a left outer join operation;
a right outer join operation;
a full outer join operation; or
a self-join operation.

12. The system of claim 5, wherein one or more of the first dataset, or the second dataset is a table included in a relational database.

13. One or more non-transitory computer-readable media storing instructions which, when executed by at least one processor, instruct the at least one processor to perform actions comprising:
apportioning a first dataset into a plurality of first dataset portions based on a first data attribute of the first dataset;
apportioning a second dataset into a plurality of second dataset portions based on the first data attribute present in the first dataset;
apportioning a third dataset into a plurality of third dataset portions based on the first data attribute present in the first dataset;
storing the plurality of first dataset portions, the plurality of second dataset portions, and the plurality of third dataset portions in a data storage device;
generating a plurality of fourth dataset portions by combining individual ones of the plurality of first dataset portions with individual ones of the plurality of second dataset portions, based at least partly on the first data attribute that is present in the first dataset and the second dataset;
generating a plurality of fifth dataset portions by combining individual ones of the plurality of first dataset portions with individual ones of the plurality of third dataset portions, based at least partly on a second data attribute that is present in the first dataset and the third dataset, the second data attribute being different than the first data attribute;
storing the plurality of fourth dataset portions and the plurality of fifth dataset portions in the data storage device;
receiving, from a user device, a data request for an output dataset specifying data associated with one or more requested data attributes, the data request including a requested time for data availability;
determining, based on the data request, that the data associated with the requested data attributes is accessible from one or more combinations of the plurality of fourth dataset portions and the plurality of fifth dataset portions;
determining a predicted time for availability of the output dataset exceeds the requested time for data availability for the output dataset;
in response to the predicted time for availability of the output dataset exceeding the requested time for data availability for the output dataset, providing to the user device the fourth dataset portions and the fifth dataset portions during the requested time for data availability;
generating one or more output datasets, the one or more datasets comprise one or more combinations of the plurality of fourth dataset portions and the plurality of fifth dataset portions; and
providing, to the user device, the one or more output datasets in response to the data request at a time exceeding the requested time for data availability.

14. The one or more non-transitory computer-readable media of claim 13, wherein:
the combining the individual ones of the plurality of first dataset portions with the individual ones of the plurality of second dataset portions includes performing a plurality of first join operations to combine the individual ones of the plurality of first dataset portions to the individual ones of the plurality of second dataset portions, the plurality of first join operations employing the first data attribute; and
the combining the individual ones of the plurality of first dataset portions with the individual ones of the plurality of third dataset portions includes performing a plurality of second join operations to combine the individual ones of the plurality of first dataset portions to the individual ones of the plurality of third dataset portions, the plurality of second join operations employing the second data attribute.

15. The one or more non-transitory computer-readable media of claim 13, wherein one or more of the apportioning of the first dataset, the apportioning of the second dataset, or the apportioning of the third dataset is based on a hashing algorithm.

16. The one or more non-transitory computer-readable media of claim 15, wherein the hashing algorithm employs, as a hash key, the first data attribute.

17. The one or more non-transitory computer-readable media of claim 15, wherein the hashing algorithm includes a modulus operation.

18. The one or more non-transitory computer-readable media of claim 13, wherein:
- the plurality of fourth dataset portions comprise a first step dataset including a first set of one or more data attributes; and
- the plurality of fifth dataset portions comprise a second step dataset including a second set of one or more data attributes that is a subset of the first set of one or more data attributes.

19. The one or more non-transitory computer-readable media of claim 18, wherein the actions further comprise:
- storing the first step dataset and the second step dataset such that the first step dataset and the second step dataset are accessible to one or more user devices prior to the one or more output datasets.

20. The one or more non-transitory computer-readable media of claim 13, wherein the generating of the plurality of fourth dataset portions is performed at least partly in parallel with the generating of the plurality of fifth dataset portions.

\* \* \* \* \*